(12) United States Patent
Mihara et al.

(10) Patent No.: US 8,823,730 B2
(45) Date of Patent: Sep. 2, 2014

(54) IMAGE DISPLAY DEVICE AND METHOD, AND IMAGE PROCESSING DEVICE

(75) Inventors: Motonobu Mihara, Kawasaki (JP); Masayoshi Shimizu, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 276 days.

(21) Appl. No.: 13/309,142

(22) Filed: Dec. 1, 2011

(65) Prior Publication Data

US 2012/0139933 A1    Jun. 7, 2012

(30) Foreign Application Priority Data

Dec. 3, 2010    (JP) .................................. 2010-270967

(51) Int. Cl.
| | |
|---|---|
| G09G 5/00 | (2006.01) |
| G09G 5/02 | (2006.01) |
| H04N 5/228 | (2006.01) |
| H04N 5/14 | (2006.01) |
| G03F 3/08 | (2006.01) |
| H04N 1/46 | (2006.01) |
| G06K 9/00 | (2006.01) |
| G06K 9/40 | (2006.01) |
| G06K 9/36 | (2006.01) |
| G06K 9/32 | (2006.01) |
| G06T 11/00 | (2006.01) |

(52) U.S. Cl.
CPC ................ G09G 5/02 (2013.01); G06T 11/001 (2013.01)
USPC ........... 345/590; 345/581; 345/606; 345/620; 345/643; 348/222.1; 348/672; 358/518; 358/522; 358/525; 358/448; 382/162; 382/254; 382/276; 382/300

(58) Field of Classification Search
USPC ......... 345/581, 589–590, 600, 606, 618–620, 345/624, 586, 643, 690; 348/177–179, 348/222.1, 223.1, 229, 234–235, 242, 348/353–355, 571, 630–631, 671–672, 348/674–675, 678; 358/1.1, 1.9, 3.24, 358/518–520, 522, 525, 530, 443, 445, 358/447–448, 461; 382/162–163, 167, 254, 382/274–276, 300
See application file for complete search history.

(56) References Cited

U.S. PATENT DOCUMENTS

| | | | | |
|---|---|---|---|---|
| 8,126,285 | B2 * | 2/2012 | Manabe | 382/274 |
| 2003/0002736 | A1 * | 1/2003 | Maruoka et al. | 382/168 |

(Continued)

FOREIGN PATENT DOCUMENTS

| | | |
|---|---|---|
| JP | 63-40472 | 2/1988 |
| JP | 11-331598 | 11/1999 |

(Continued)

OTHER PUBLICATIONS

Office Action mailed Jun. 3, 2014, in Japanese Patent Application No. 2010-270967 (with English-language translation).

*Primary Examiner* — Wesner Sajous
(74) *Attorney, Agent, or Firm* — Oblon, Spivak, McClelland, Maier & Neustadt, L.L.P.

(57) ABSTRACT

An image display device includes a creation unit configured to calculate histogram data before correction that indicates a luminance distribution from an input image data; a clip processing unit configured to set a value of the number of pixels of a tone to an upper threshold when the tone among tones of luminance values in the histogram data; an addition unit configured to add a value of the number of pixels based on a difference between the upper threshold and a value of the number of pixels for each tone that is set to the upper threshold in the histogram data before correction to a value of the number of pixels of at least a part of tones that are present between a first luminance value and a second luminance value and to output obtained corrected histogram data; and a correction unit configured to correct the input image data.

20 Claims, 16 Drawing Sheets

(56) References Cited

U.S. PATENT DOCUMENTS

| | | | |
|---|---|---|---|
| 2005/0100242 A1* | 5/2005 | Trifonov et al. | 382/274 |
| 2007/0081721 A1* | 4/2007 | Xiao et al. | 382/167 |
| 2009/0051714 A1* | 2/2009 | Ohhara | 345/690 |
| 2010/0157078 A1* | 6/2010 | Atanassov et al. | 348/222.1 |
| 2011/0050934 A1* | 3/2011 | Mitsunaga | 348/222.1 |
| 2011/0128296 A1* | 6/2011 | Mihara et al. | 345/589 |
| 2011/0150356 A1* | 6/2011 | Jo et al. | 382/269 |
| 2011/0170775 A1* | 7/2011 | Manabe | 382/167 |
| 2011/0206280 A1* | 8/2011 | Lee | 382/167 |
| 2011/0292246 A1* | 12/2011 | Brunner | 348/231.99 |

FOREIGN PATENT DOCUMENTS

| | | |
|---|---|---|
| JP | 2001-243463 | 9/2001 |
| JP | 2002-140700 A | 5/2002 |
| JP | 2003-46859 | 2/2003 |

* cited by examiner

FIG. 1A
RELATED ART
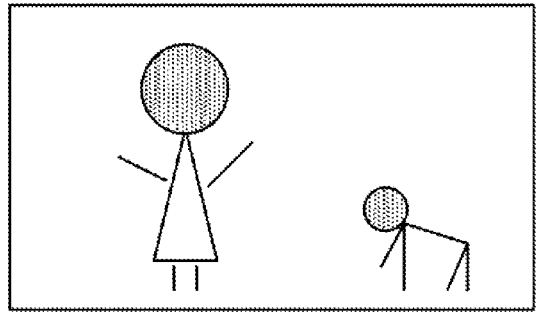
IMAGE BEFORE CORRECTION
(ORIGINAL IMAGE)
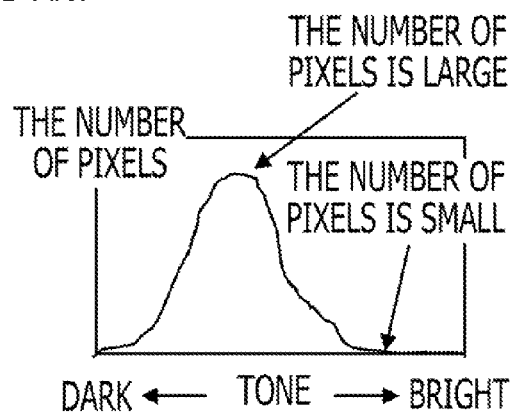
HISTOGRAM BEFORE CORRECTION
FIG. 1B
RELATED ART
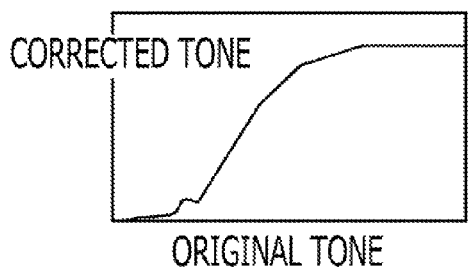
THE NUMBER OF PIXELS
CUMULATIVE TONE CURVE
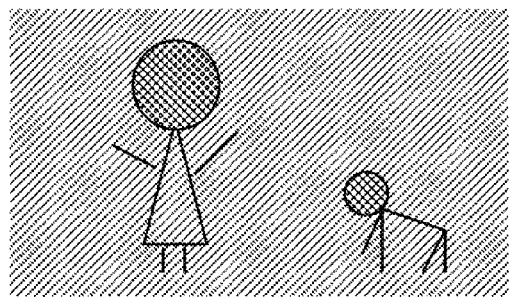
CORRECTED IMAGE

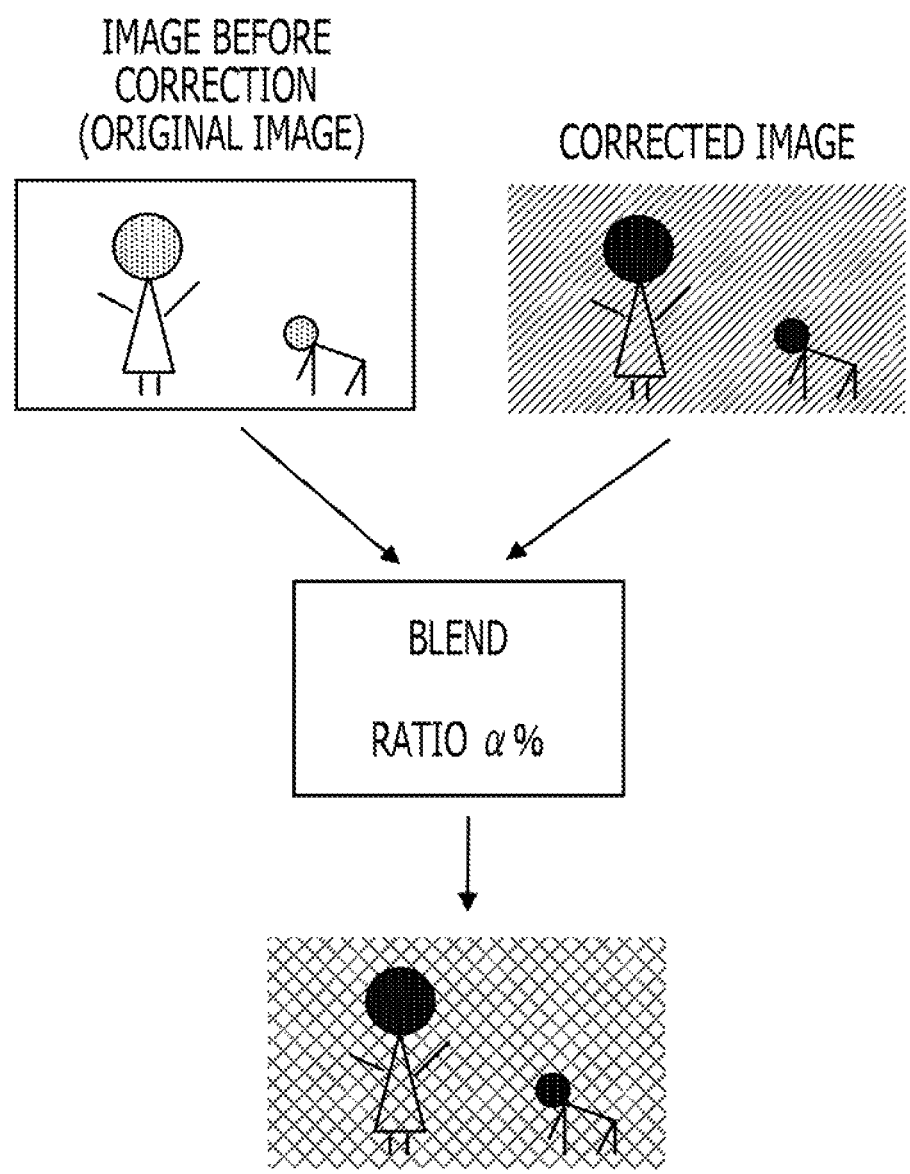

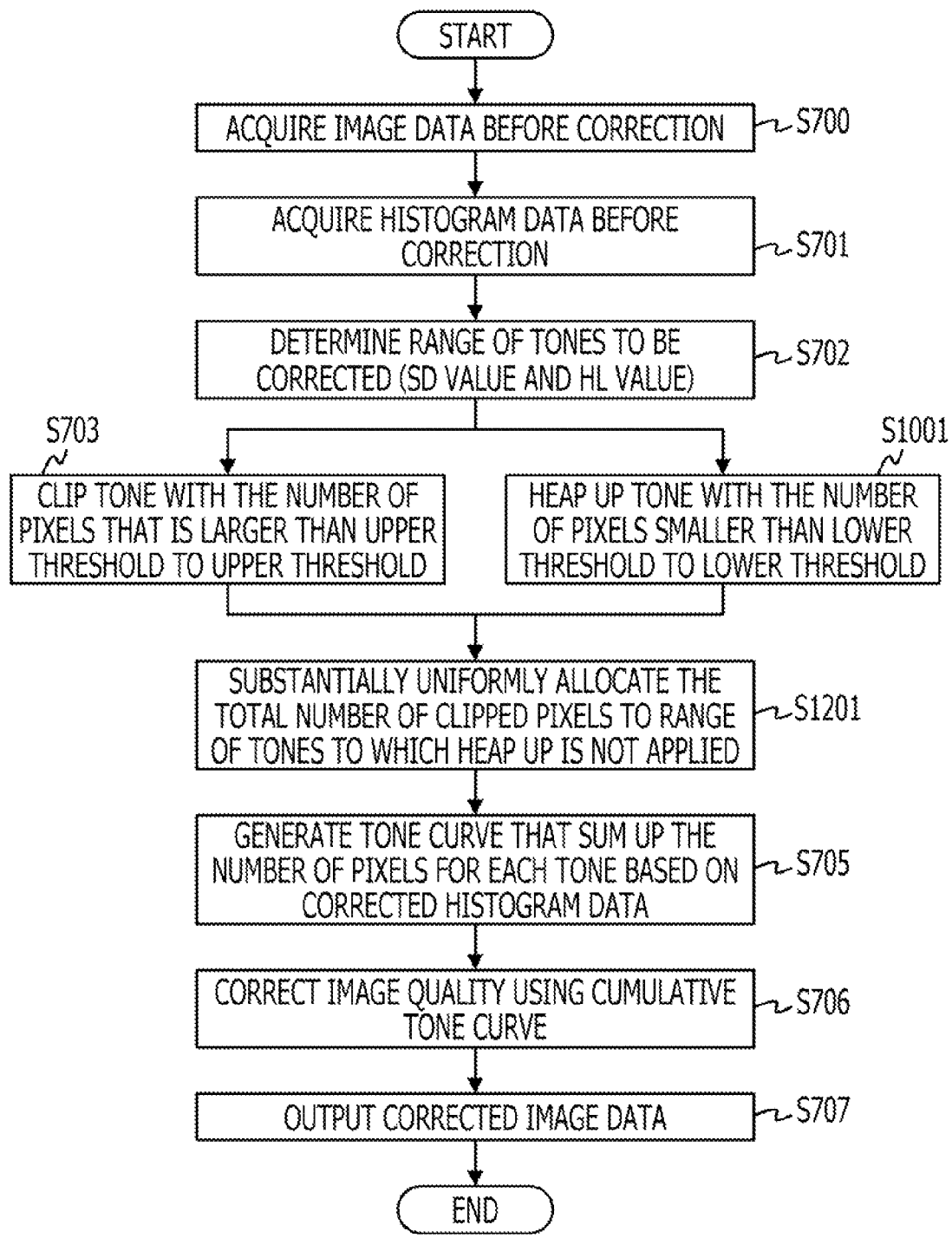

FIG. 14A

CONTRAST ΔL

|  | ORIGINAL IMAGE | EMBODIMENT | RELATED ART |
|---|---|---|---|
|  | ΔL | ΔL | ΔL |
| LOW TONE (30 - 60) | 13 | 36 | 55 |
| MEDIUM TONE (110 - 140) | 11 | 12 | 2 |
| HIGH TONE (150 - 180) | 34 | 38 | 14 |

FIG. 14B

CONTRAST ΔL

|  | ORIGINAL IMAGE | EMBODIMENT | RELATED ART |
|---|---|---|---|
|  | ΔL | ΔL | ΔL |
| LOW TONE (30 - 50) | 1 | 8 | 16 |
| MEDIUM TONE (120 - 130) | 6 | 8 | 4 |
| HIGH TONE (150 - 180) | 14 | 19 | 12 |

IMAGE DISPLAY DEVICE AND METHOD, AND IMAGE PROCESSING DEVICE

CROSS-REFERENCE TO RELATED APPLICATION

This application is based upon and claims the benefit of priority of the prior Japanese Patent Application No. 2010-270967, filed on Dec. 3, 2010, the entire contents of which are incorporated herein by reference.

FIELD

The embodiments discussed herein are related to an image display device, an image display method, and image processing device.

BACKGROUND

When an image display device is used where the influence of external light, such as ambient light, is large, there is a drawback in that an image displayed on a panel is difficult to see due to the reflection of external light. The drawback is caused because a dynamic range of the display image is narrowed due to the reflection. A contrast needs to be enhanced to effectively use an entire range of tone width in order to improve deteriorated image quality after external light is irradiated.

For example, as discussed in Japanese Laid-open Patent Publication No. 11-331598, a technique is known that equalizes a histogram in order to use an entire range of tone width from dark to bright portions.

Moreover, for example, as discussed in Japanese Laid-open Patent Publication No. 2002-140700, there is a technique to suppress an excessive contrast emphasis by generating a histogram of an image, clipping pixels equals to or greater than the certain numbers of pixels for each luminance, and uniformly allocating the total number of clipped pixels to all of the luminance.

SUMMARY

According to an aspect of the invention, an image display device includes: a creation unit configured to calculate histogram data before correction that indicates a luminance distribution from an input image data that is input; a clip processing unit configured to set a value of the number of pixels of a tone to an upper threshold when the tone among tones of luminance values in the histogram data before correction includes the value of the number of pixels greater than or equal to the upper threshold; an addition unit configured to add a value of the number of pixels based on a difference between the upper threshold and a value of the number of pixels for each tone that is set to the upper threshold by the clip processing unit in the histogram data before correction to a value of the number of pixels of at least a part of tones that are present between a first luminance value and a second luminance value and to output obtained corrected histogram data; a correction unit configured to correct the input image data to output image data based on the corrected histogram data; and a display unit configured to display the output image data.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B illustrate an image equalization technique and a drawback of the related-art;

FIG. 2 illustrates a blend method of the related art;

FIG. 12 is a flow chart illustrating a control operation according to the fourth embodiment;

FIGS. 14A and 14B compare tones and contrasts (difference between lightness and darkness) before and after correcting an image to which a tone curve according to an embodiment is applied, and to which a tone curve of a related-art method (equalization) is applied;

DESCRIPTION OF EMBODIMENTS

Figure 3A:
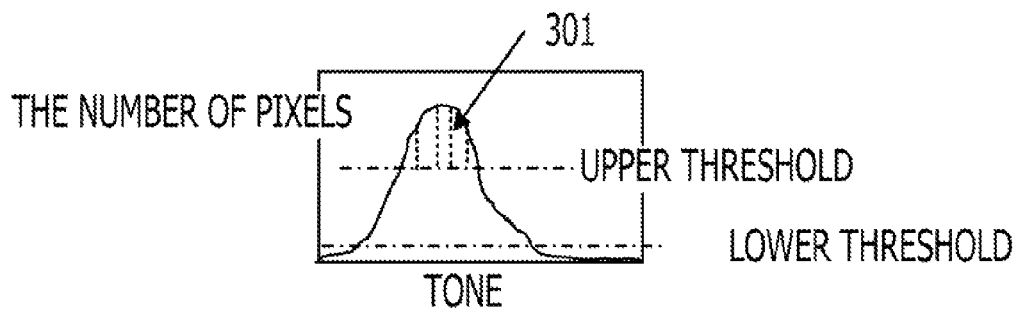
FIGS. 3A to 3C illustrate a clip technique of the related art and a heap up technique of the related art.

The above-noted related-art describes that a histogram equalization technique may excessively correct image quality or may cause a contrast to be reduced between lightness and darkness depending on an original image before applying a correction.

Furthermore, the according to the related-art technique that uses the above-described clip processing, in order to avoid a gradient of a tone curve to exceed a certain degree, the clip processing is applied to a luminance that the number of pixels distributed in a histogram is equal to or is greater than a threshold. The total number of clipped pixels is then uniformly allocated to all luminance. Thus, pixels are allocated even to an area where no pixel is distributed in the histogram of the input image. Accordingly, even if an input luminance value is, for example, 0 in the histogram before allocating pixels, the output luminance may be, for example, 2 according to a corrected curve based on the histogram after allocating the pixels. In particular, when pixels are allocated to low luminance and high luminance, for example, a black with a luminance value 0 may be corrected to black with a luminance value 2. In other words, for example, luminance values from 0 to 2 are not used for output luminance, and a dynamic range is not extended to a part where the luminance value is 0. The phenomenon applies to high luminance as well.

Thus, a method is proposed to reduce, if not substantially prevent, causing low luminance and high luminance portions to be ineffective in a method to reduce, if not substantially prevent, excessive contrast emphasis.

FIGS. 1A and 1B illustrate an image equalization technique and a drawback of the related-art. Image equalization is a technique to correct image quality using a tone curve that is generated by summing up the number of pixels for each tone from a histogram of the image as a density conversion curve of the image. In other words, as illustrated in FIG. 1A, a luminance distribution that is depicted as a histogram is generated from an image before correction. In the histogram, the number of pixels having a luminance value of a tone is counted starting from a luminance value corresponding to dark lightness to a luminance value corresponding to bright lightness. A tone curve illustrated in FIG. 1B is generated by summing up the number of pixels for each tone in order of a luminance value corresponding to a dark lightness based on the histogram. The tone curve is used as a density conversion curve to convert an original tone of a luminance value of each pixel before correction into a tone after correction.

In a related-art image equalization technique, a gradient of a tone curve suddenly becomes steep between tones that have a large number of pixels. Meanwhile, the gradient of the tone curve is gradual between tones that have a small number of pixels. Thus, problems may be caused in which the image quality after correction by a tone curve illustrated in FIG. 1B may be excessively corrected at a tone with a steep gradient, or a contrast may be reduced at a tone with a flat gradient.

An image blend method is considered as a technique to alleviate the above-described problems. As illustrated in FIG. 2, the blend method adjusts image quality by optionally changing a ratio of chromaticity α % of an image before correction and the image after the correction.

As described above, the related-art blend method that adjusts image quality by blending the corrected image after equalization with the image before correction may enhance image quality after correction. Meanwhile, typically equalization and blend may not adjust excessive correction or reduction of contrast, and image quality may be deteriorated as compared with the image before correction.

In order to address the above problems, a clip method as described below may be considered. In other words, as illustrated in 301 in FIG. 3A and 302 in FIG. 3B, in a histogram generated from an image before correction, for a tone with the number of pixels greater than or equal to an upper threshold, the pixels greater than or equal to the upper threshold are clipped to the upper threshold. A total sum of the number of pixels clipped for respective tones is substantially uniformly allocated to all of the tone range. Thus, the total number of pixels is substantially the same as that of the original histogram. For example, when the number of pixels for a tone is 8,300 and an upper threshold is 5,000, the number of pixels to be clipped is 3,300. Moreover, for example, a total sum of the number of clipped pixels is 25,600 and when 25,600 is substantially uniformly allocated to all of the tones (for example, the number of tones is 128), the number of pixels to be allocated to each tone is 200.

Figure 3B:
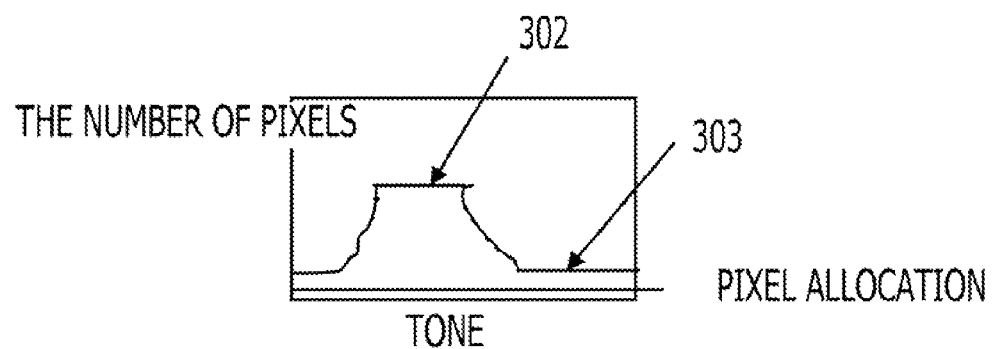

In a histogram before correction illustrated in FIG. 3A, for a tone with a number of pixels that is less than a lower threshold, a technique may be considered to increase the number of pixels to the lower threshold as illustrated in FIG. 3B. Hereinafter, the method to increase the number of pixels to the lower threshold is referred to as heap up. For example, the heap up processing increases the number of pixels for a tone with the number of pixels less than the lower threshold of 200 when the lower threshold is 200.

Figure 3C:
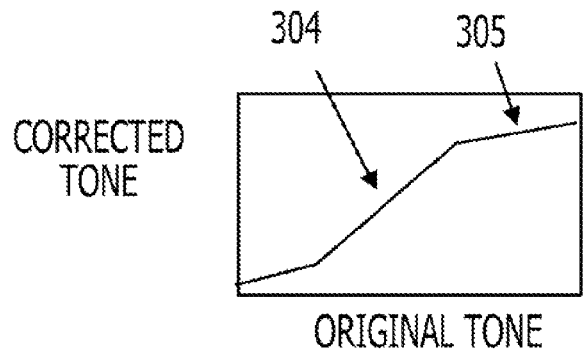

A tone curve of FIG. 3C is generated by using a histogram to which the clip processing and the heap up processing are applied. The tone curve is used as a density conversion curve to convert a tone of an image before correction into a tone after correction. The tone of an image before correction is referred to as an original tone. The tone curve may substantially suppress an excessive gradient by the clip processing as illustrated in 304 of FIG. 3C. Moreover, the tone curve may apply a tone difference to a tone with a small number of pixels by the heap up processing as illustrated in 305 of FIG. 3C. In other words, flatness of a contrast may be substantially avoided. As a result, excessive contrast emphasis or flatness of a contrast may be expected to be substantially suppressed.

However, the clip method and the heap up method that are described using FIGS. 3A to 3C substantially uniformly allocate the total number of clipped pixels to all luminance. Thus, the pixels are allocated to an area where no pixel is distributed in the histogram of the input image.

Hereinafter, a first embodiment to a fifth embodiment will be sequentially described.

Figure 4:
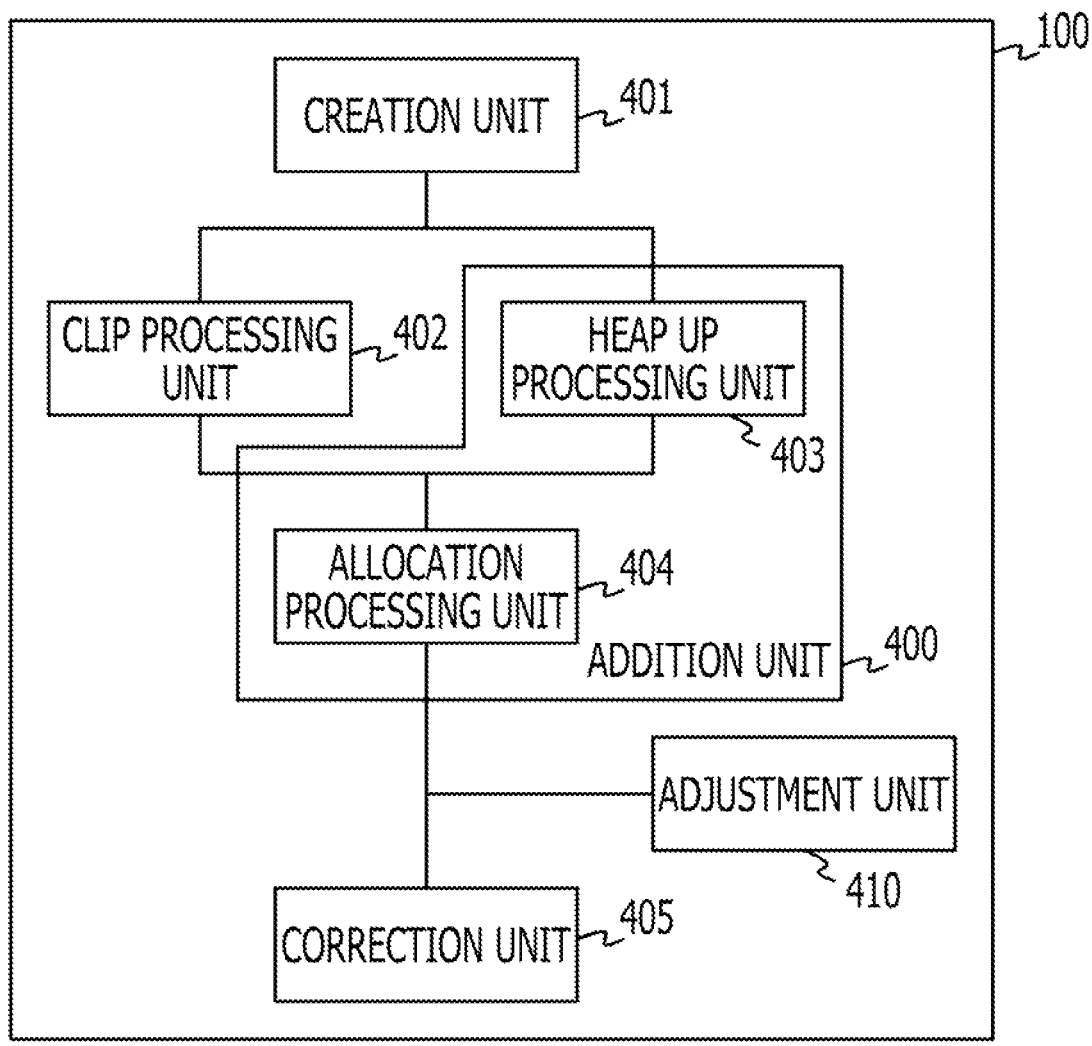
FIG. 4 is a functional block diagram according to a first embodiment of an image display device.

FIG. 4 is a functional block diagram of an image processing device 100 according to a first embodiment. For example, a configuration of each functional block may be applied to a pixel display device of a computer. The computer may be, for example, a personal computer, a mobile phone, a portable computer, a car navigation device, and a digital camera.

Figure 7:
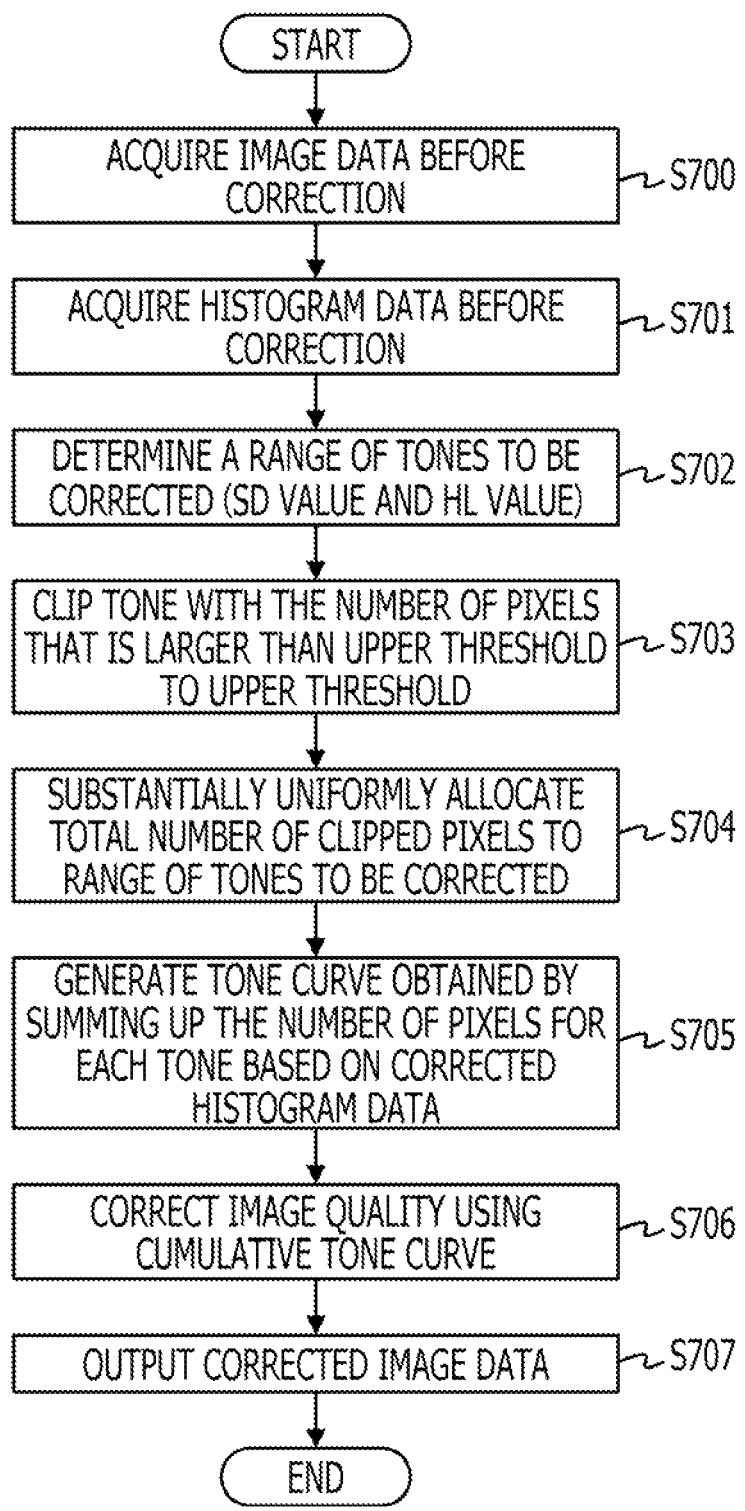
FIG. 7 is a flow chart illustrating a control operation according to a second embodiment.
Figure 10:
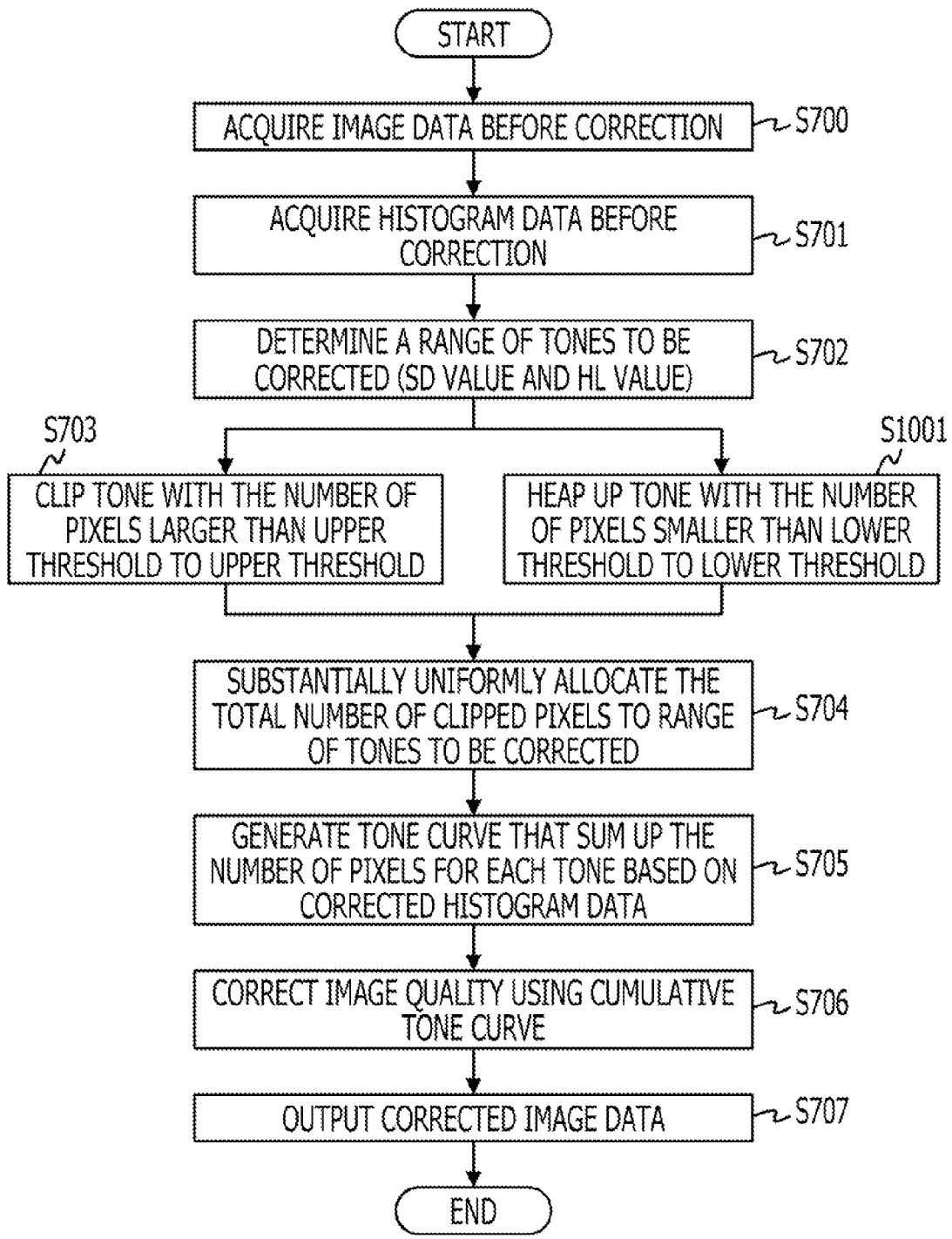
FIG. 10 is a flow chart illustrating a control operation according to the third embodiment.

Each processing unit of a functional block illustrated in FIG. 4 may be achieved by executing a program that performs at least a part of processing illustrated in FIGS. 7, 10, and 12 by a CPU of a computer.

A creation unit 401 computes histogram data before correction 407 (illustrated in FIG. 5A) that indicates a luminance distribution from input image data.

A clip processing unit 402 clips a value of the number of pixels for a tone to a certain upper threshold when the value of the number of pixels for each tone of luminance values in the histogram data before correction 407 is equal to or greater than the certain upper threshold.

A heap up processing unit 403 sets a value of the number of pixels to a certain lower threshold when the value of the number of pixels for each tone between a first tone threshold and a second tone threshold in the histogram data before correction 407 is less than the certain lower threshold. A first tone threshold is a first luminance value. A second tone threshold is a second luminance value.

An allocation processing unit 404 allocates a total sum of the number of pixels clipped for respective tones to a value of the number of pixels for respective tones that are present between the first luminance value and the second luminance value. The allocation processing unit 404 outputs corrected histogram data 408 (illustrated in FIG. 5B). The heap up processing unit and the allocation processing unit correspond to an addition unit 400. The addition unit 400 adds a value of the number of pixels that supplements at least a part of the value of the number of clipped pixels to values of the number of pixels for respective tones that are present between the first luminance value and the second luminance value.

A correction unit 405 outputs output image data 409 obtained by correcting an input image data based on the corrected histogram data 408. For example, the correction unit 405 generates a tone curve obtained by summing up the number of pixels from the corrected histogram data 408. The correction unit 405 uses the tone curve as a density conversion curve to convert an original tone of a luminance value of each pixel in the input image data to a tone of the output image data 409.

An adjustment unit 410 adjusts the total number of pixels of the corrected histogram data 408 so as to match with the total number of pixels of the histogram data before correction 407 within a certain error range when the total number of pixels of the corrected histogram data 408 exceeds the total number of pixels of the histogram data before correction 407. For example, the adjustment unit 410 adjusts the number of pixels for each tone of the corrected histogram data 408 by reducing substantially uniformly the number of pixels for each tone, or reducing the value of the number of pixels in order from a tone with substantially the largest value of the number of pixels.

According to the above-described first embodiment, the first luminance value and the second luminance value are provided. Accordingly, excessive contrast emphasis or flattening of the contrast may be substantially suppressed and output luminance may be appropriately allocated to a low luminance area where the luminance value is less than or equal to the first luminance value, and a high luminance area where the luminance value is greater than or equal to the second luminance value.

The image processing device 100 according to the embodiment is described to perform the clip processing, the allocation processing, and the heap up processing. However, the disclosure is not limited thereto. For example, the image processing device 100 according to the embodiment may perform the clip processing and the heap up processing. The heap up processing is applied to a tone with a number of pixels that is less than or equal to a lower threshold for an area from the first luminance value to the second luminance value.

A configuration of a second embodiment substantially corresponds to the configuration of the first embodiment with the exception of the heap up processing unit 403 and the adjustment unit 410.

According to the second embodiment, the allocation processing unit 404 allocates a total sum of the number of pixels clipped for respective tones to values of the number of pixels of all tones that are present between the first luminance value and the second luminance value.

A configuration of a third embodiment corresponds to the configuration of the first embodiment that includes the heap up processing unit 403 but that does not include the adjustment unit 410.

Meanwhile, a configuration of a fourth embodiment is substantially the same as the configuration of the third embodiment. Additionally, the allocation processing unit 404 allocates a total sum of the number of pixels clipped for respective tones to a value of the number of pixels for each tone that is greater than or equal to a lower threshold within a range of tones that are present between the first luminance value and the second luminance value.

Moreover, a configuration of a fifth embodiment is obtained by further adding an adjustment unit 410 to the configuration of the fourth embodiment.

Figure 5A:
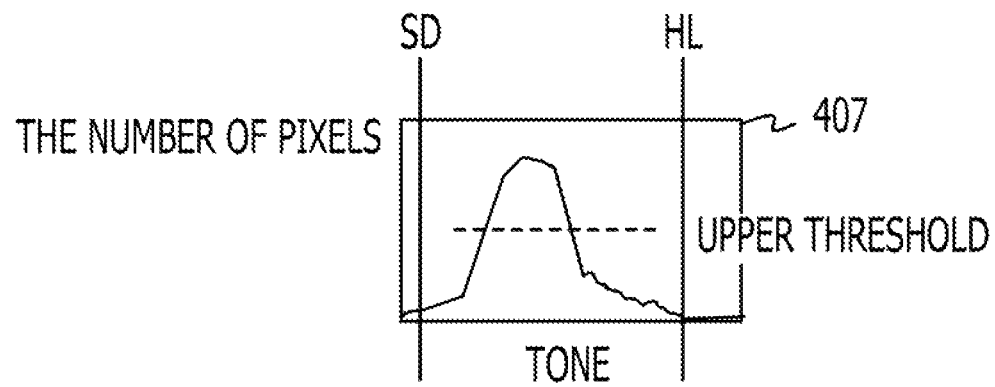
FIGS. 5A to 5C illustrate a second embodiment.
Figure 5B:
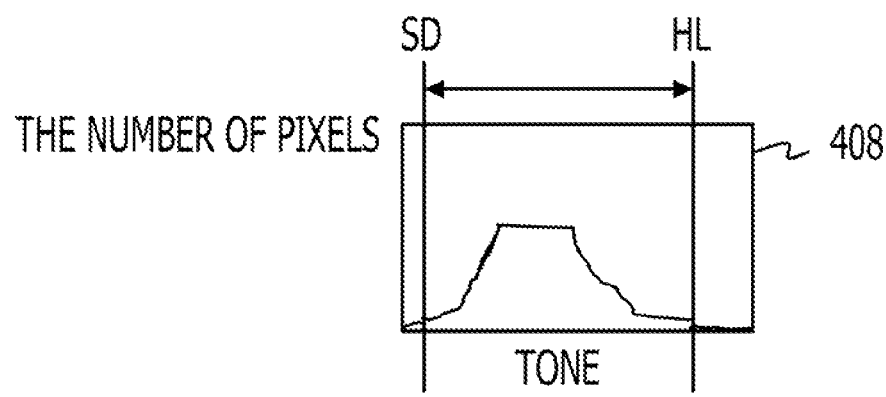
Figure 5C:
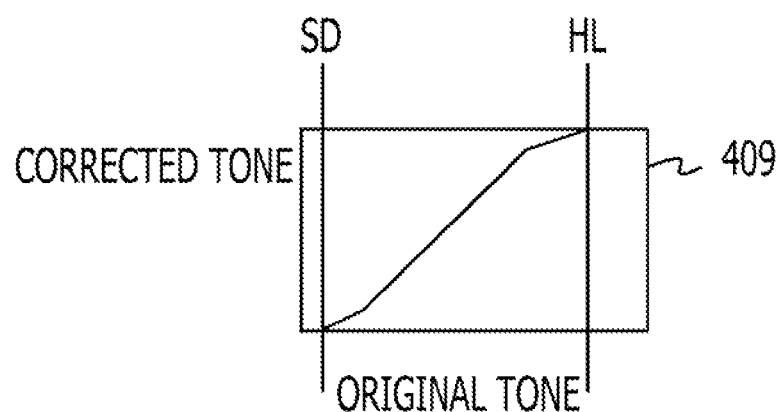

Based on the above-described configurations, the second embodiment of the image display device will be described. FIGS. 5A to 5C illustrate an example of the second embodiment. A creation unit 401 in FIG. 4 generates histogram data before correction 407 illustrated in FIG. 5A from input image data. In FIG. 5A, the horizontal axis indicates tones of luminance values in the input image data, while the vertical axis indicates a value of the number of pixels for each tone. Substantially the same applies to FIGS. 5B and 5C, and FIGS. 11A, 11B, 13A, 13B, 15A and 15B, which will be described later.

When a value of the number of pixels for a tone among tones of luminance values in the histogram data before correction 407 is greater than or equal to an upper threshold illustrated in FIG. 5A, a clip processing unit 402 in FIG. 4 clips the value of the number of pixels to the upper threshold. Accordingly, as illustrated in FIG. 5B, a portion that is greater than or equal to the upper threshold may be flattened.

The allocation processing unit 404 allocates a total sum of the number of pixels clipped for each tone to a value of the number of pixels for respective tones in the histogram data before correction 407 that are present between a first luminance value SD and a second luminance value HL. For example, the allocation processing unit 404 divides a total sum of the number of pixels clipped for respective tones by the number of tones from SD+1 to HL−1. The allocation processing unit 404 adds the division result to a value of the number of pixels of respective tones from the SD+1 to HL−1. The allocation processing unit 404 outputs the addition results as a value of the number of pixels for respective tones from the SD+1 to HL−1 of the corrected histogram data 408. Moreover, the allocation processing unit 404 outputs values of the number of pixels for tones from 0 to SD and from HL to substantially the maximum tone value in the histogram data before correction 407 as values of the number of pixels in the corrected histogram data 408. The allocation processing unit 404 may forcibly output 0 for values of the number of pixels for tones from 0 to SD and from HL to substantially the maximum tone value of the corrected histogram data 408.

The first luminance value SD is, for example, a tone value of a shadow portion in which the luminance value is near 0. Moreover, the second luminance value HL is, for example, a tone value for a highlight portion in which the luminance value is near substantially the maximum value.

The correction unit 405 generates a tone curve illustrated in FIG. 5C by summing up the number of pixels from the corrected histogram data 408 in FIG. 5B. The correction unit 405 uses the tone curve illustrated in FIG. 5C as a density conversion curve.

In the corrected histogram data 408 of FIG. 5B generated as described above, no pixel is allocated by clipping to values of the number of pixels for tones that are less than or equal to the SD and values of the number of pixels for tones in which the luminance values are near 0. Likewise, no pixel is allocated by clipping to a value of the number of pixels for the tones greater than the HL and values of the number of pixels for tones that the luminance values are near substantially the maximum value. Hence, the output image data 409 may appropriately maintain low luminance values and high luminance values by correcting input image data using a tone curve based on the corrected histogram data 408 by the image processing device 100.

For example, a total number of pixels in an image of 800 pixels in horizontal×400 pixels in vertical is 320,000 pixels. In a histogram of the full 256 tones, it is assumed that an upper threshold of clipping is 2000, a tone value of the first luminance value SD is 20, and a tone value of the second luminance value HL is 221. At this time, when there is a tone having a value of the number of pixels that exceeds the upper threshold 2000, the clip processing unit 402 clips the value of the number of pixels to 2000. When a total number of pixels clipped by the clip processing unit 402 is 50,000, the allocation processing unit 404 substantially uniformly allocates the number of pixels, 50,000 to 200 tones from 21 to 220. Hence, the number of pixels allocated to each tone is 250. According to the second embodiment, the number of pixels for the clipped portion is 2250. The value of the number of pixels for tones to which clipping are applied may remain to be 2000 without allocating the number of pixels.

Figure 6:
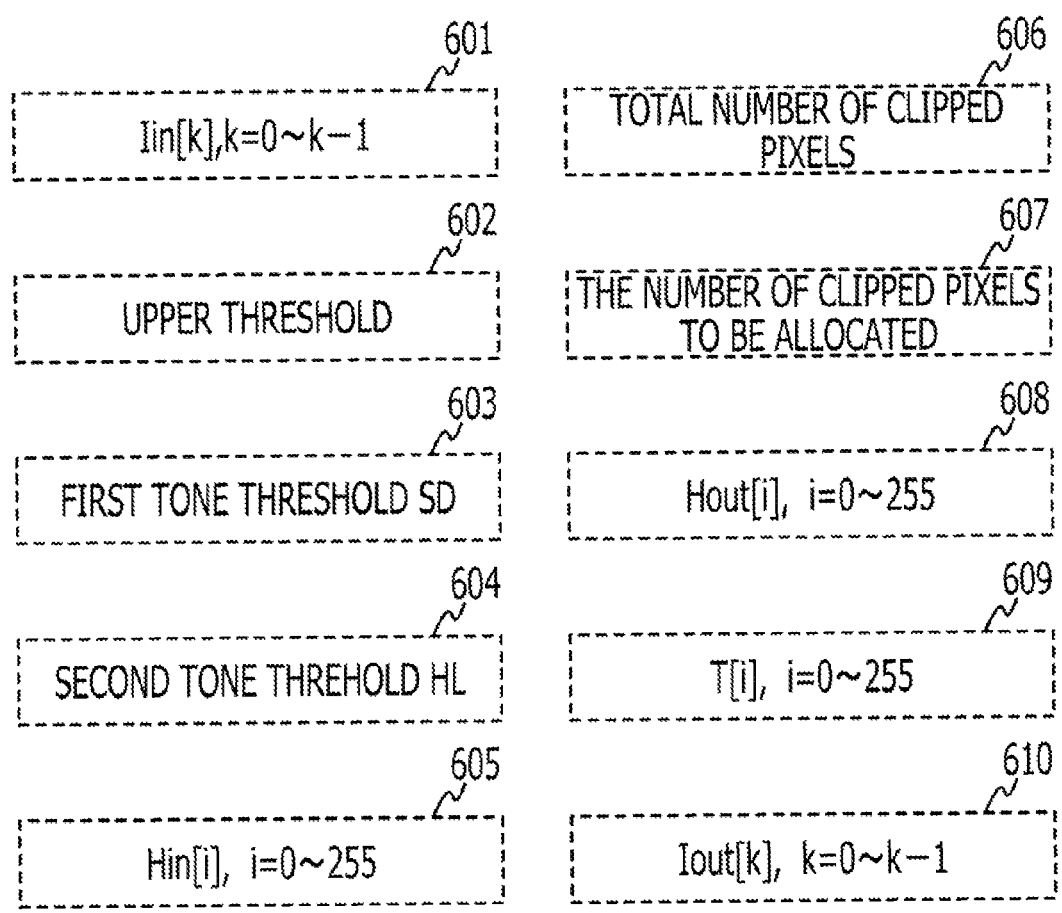
FIG. 6 illustrate data configuration according to a second embodiment.

FIG. 6 illustrates a configuration of data used by the second embodiment. The data may be stored in a memory or a register in a processor that is included in the image display device but not illustrated.

In FIG. 6, the Iin [k] 601 indicates luminance values of the input image data and are sequence data of luminance values for K pixels from k=0 to k=K−1 for one screen.

The upper threshold 602 is data that indicates a threshold when clip processing is performed.

The first luminance value SD 603 indicates register data for the first luminance value SD. The second luminance value HL 604 indicates register data for the second luminance value HL.

The Hin [i] 605 indicates histogram data before correction 407, and, for example, is sequence data of values of the number of pixels for 256 tones from 0 to 255.

The total number of clipped pixels 606 indicates register data of a total number of clipped pixels that is output by the clip processing unit 402 in FIG. 4.

The number of clipped pixels to be allocated 607 indicates register data of the number of clipped pixels to be allocated by the allocation processing unit 404 in FIG. 4.

The Hout [i] 608 indicates corrected histogram data 408 and, for example, is sequence data of the number of pixels for 256 tones from 0 to 255.

The T [i] 609 indicates a cumulative tone curve generated internally by the correction unit 405 in FIG. 4 and, for example, is sequence data of a value of the number of pixels for 256 tones from 0 to 255.

The Iout [k] 610 indicates a luminance value of output image data 409 and is sequence data of luminance values for K pixels from k=0 to k=K−1 for one screen.

FIG. 7 is a flow chart illustrating a control operation executed by an image display device according to the second embodiment based on the data configuration illustrated in FIG. 6. The flow chart indicates, for example, an operation that an image processor in the display image device executes, a control program stored in a program memory in the image display device. Alternatively, the flow chart indicates an operation executed by hardware dedicated to image processing.

Sequence data Iin [k] (k=0 to K−1) of the input image data for one screen is read from a memory (operation S700), and a tone for sequence data I in [k] for each luminance value is determined. For example, when a luminance value for sequence data I in [0] is 0, 1 is added to a value of sequence data value Hin [0] on the memory 605 (illustrated in FIG. 6) corresponding to a tone 0 of the histogram data before correction 407. When a luminance value of the sequence data Iin [k] is "i," generally, 1 is added to a value of sequence data value Hin [i] on the memory corresponding to a tone "i" of the histogram data before correction 407. As a result, sequence data Hin [i] (i=0 to 255) of the histogram data before correction 407 in which the number of pixels for 256 tones from 0 to 255 is counted is calculated and secured in the memory (operation S701). The above-described processing corresponds to functions of the creation unit 401 of FIG. 4.

Data for the first luminance value SD and for the second luminance value HL is read to the register in the processor from the memory and a range to correct tones is determined (operation S702).

Data of the upper threshold for the clip processing is read to the register in the processer from the memory. Moreover, a register for a total number of clipped pixels is secured in the processor. Sequence data Hin [i] (i=0 to 255) of a value of the number of pixels for each tone of the histogram data before correction 407 is read from the memory. A tone x in which each sequence data value is greater than or equal to a register value of the upper threshold, sequence data value Hin [x] corresponding to the tone is replaced with the register value of the upper threshold and clipped, and rewritten to the memory. At this time, the number of clipped pixels=the original Hin [x] value−upper threshold is cumulatively calculated to the register of the total number of clipped pixels (operation S703). The processing corresponds to functions of the clip processing unit 402 in FIG. 4.

A total sum of the number of pixels clipped for respective tones is allocated to respective values of the number of pixels for tones that are present between the first luminance value SD and the second luminance value HL. For example, the register value of the total number of clipped pixels is added respectively to sequence data value Hin [SD+1] to Hin [HL−1] on the memory corresponding to tones that are present between register values of the first luminance value SD and the second luminance value HL in the histogram data before correction 407. The respective addition results are calculated as sequence data values H out [SD+1] to Hout [HL−1] of the corrected histogram data 408 corresponding to respective tones from SD+1 to HL−1 and are written to the memory. Moreover, values of the number of pixels for respective tones from 0 to SD and from HL to substantially the maximum tone value in the histogram data before correction 407 are output as they are as the values of the number of pixels for respective tones in the corrected histogram data 408. In other words, respective sequence data values Hin [0] to Hout [SD], and Hin [HL] to Hin [255] are written as they are to the memory as corresponding sequence data values Hout [0] to Hout [SD], and Hout [HL] to Hout [255]. For values of the number of pixels for tones from 0 to SD and from HL to substantially the maximum tone value in the corrected histogram data 408, 0 may be forcibly output. In other words, sequence data values Hout [0] to Hout [SD], and Hout [HL] to Hout [255] may all be forcibly 0 (operation S704). The processing corresponds to functions of the allocation processing unit 404 in FIG. 4.

The sequence data Hout [i] (i=0 to 255) in the corrected histogram data 408 is read from the memory. Sequence data values T [i] (i=0 to 255) of a cumulative tone curve is generated by cumulatively calculating sequence data value Hout [i] sequentially from i=0. In other words, calculations (1) or (2) below is performed sequentially from i=0 to i=255.

$$T[i]=Hout[i] (\text{when } i=0) \tag{1}$$

$$T[i]=Hout[i-1]+Hout[i] (\text{when } i=\text{other than } 0) \tag{2}$$

The T [i] (i=0 to 255) is normalized so that a substantially maximum value T [255] in the cumulative tone curve T [i] (i=0 to 255) becomes a substantially maximum tone value 255. In other words, the calculations (3) and (4) below are performed.

$$A=255/T[255] \tag{3}$$

$$T[i]=T[i]\times A (i=0 \text{ to } 255) \tag{4}$$

The calculation result is written to the memory (operation S705). The processing corresponds to a part of functions of the correction unit 405 in FIG. 4.

The input image data is converted by using the cumulative tone curve T [i] (i=0 to 255) generated on the memory as described above (operation S706). And the converted input image data is output as the output image data 409 (operation S707). For example, each sequence data value I in [k] (k=1 to K−1) of the input image data is sequentially read and I out [k]=T [I in [k]] (k=1 to K−1) is calculated and written to the memory. Each sequence data value I out [k] (k=1 to K−1) of the output image data 409 corrected as described above is output to display the image. The processing corresponds to a part of the functions of the correction unit 405 of FIG. 4.

Figure 8A:
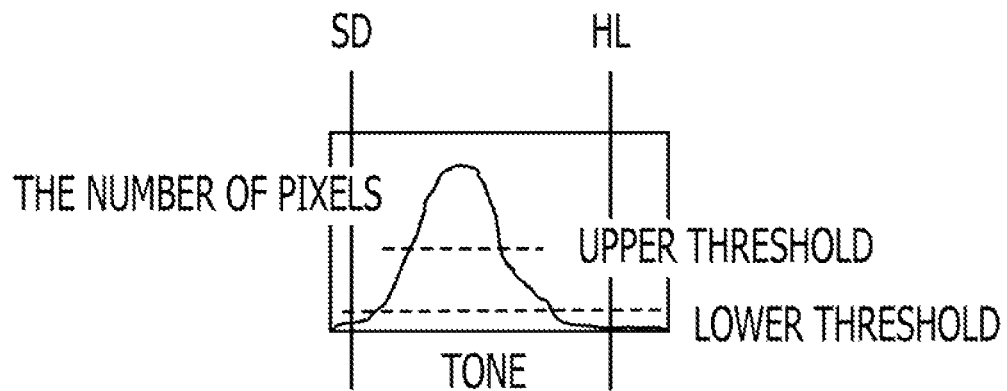
FIGS. 8A and 8B illustrate a third embodiment.
Figure 8B:
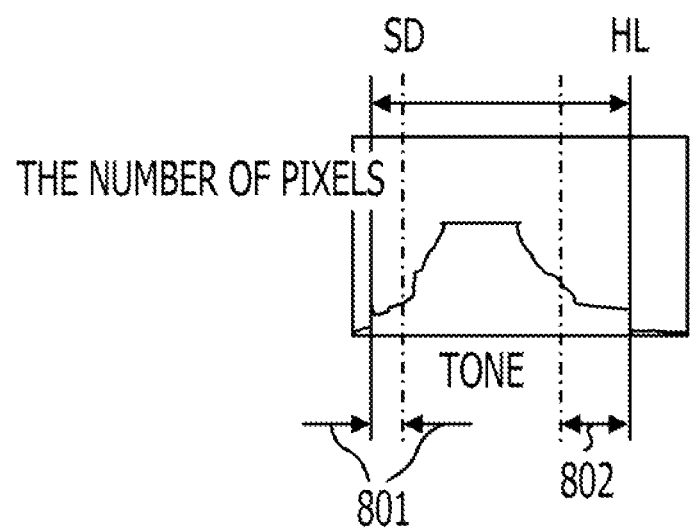

A third embodiment of an image display device will be described. FIGS. 8A and 8B illustrate the third embodiment.

In the histogram data before correction 407, a configuration in that when a value of the number of pixels of a tone is greater than or equal to an upper threshold, the value of the number of pixels is clipped to the upper threshold is substantially the same as the configuration of the first embodiment. Moreover, a configuration that the total number of clipped pixels is substantially uniformly allocated to tones from the first luminance value SD+1 to the second luminance value HL−1 is substantially the same as the configuration of the second embodiment.

A difference between the configurations of the third embodiment and that of the second embodiment is that the third embodiment includes a heap up processing unit 403 in addition to the configuration of the second embodiment.

In histogram data before correction 407 illustrated in FIG. 8A, the heap up processing unit 403 sets values of the number of pixels for tones that are present between SD and HL and that are less than the lower threshold to the lower threshold. The processing heaps up values of the number of pixels to the lower threshold in a range between the arrow 801 and the arrow 802 in FIG. 8B.

A correction unit 405 in FIG. 4 uses a cumulative tone curve generated from corrected histogram data 408 illustrated in FIG. 8B as a density conversion curve.

In the corrected histogram data 408 generated as described above, as in the second embodiment, no pixels are allocated by clipping to values of the number of pixels for tones that are less than or equal to SD and greater than or equal to HL. Hence, the output image data 409 may appropriately maintain low luminance values and high luminance values by correcting input image data using a tone curve generated from the corrected histogram data 408. In addition to this, according to the third embodiment, applying heap up processing in an appropriate range makes a tone with a small number of pixels different from other tones and flatness of a contrast may be substantially avoided.

Figure 9:
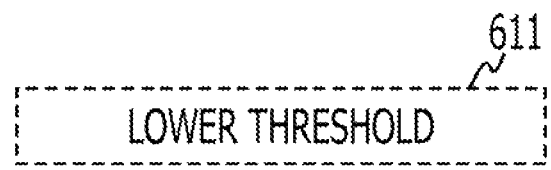
FIG. 9 illustrates a data configuration added by the third embodiment.

FIG. 9 illustrates a data configuration of the third embodiment that is added to the data configuration of the second embodiment illustrated in FIG. 6. The data is stored in a memory or a register in a processor that is included in the image display device (not illustrated). In other words, a lower threshold 611 indicates register data of a lower threshold. The lower threshold is used to determine whether heap up processing is applied as illustrated in FIG. 8A.

FIG. 10 is a flow chart illustrating a control operation executed by the image display device according to the third embodiment based on the data configurations of FIGS. 6 and 9. The flow chart is, for example, as in the first embodiment, an operation that an image processor in the image processing device executes a control program stored in a program memory in the image processing device. Alternatively, the flow chart indicates an operation executed by hardware dedicated to image processing.

In the flow chart of FIG. 10, processing to which the same reference numeral as the second embodiment in FIG. 7 is applied is used for substantially the same processing as in FIG. 7, and therefore, will not be described.

According to the third embodiment, clip processing and heap up processing as described below are performed at operation S703.

In other words, after operation S702, data of the lower threshold for the heap up processing is read to a register in a processor from the memory. Sequence data Hin [i] (i=0 to 255) of a value of the number of pixels for each tone of the histogram data before correction 407 is read from the memory and each sequence data Hin [SL+1] to Hin [HL−1] for tones that are present between the first luminance value SD+1 to the second luminance value HL−1 are determined whether the heap up processing is applied. For a tone "y" that a value of the number of pixels equals to or is greater than a register value of the lower threshold, sequence data value Hin [y] corresponding to the tone is replaced with the register value of the lower threshold and is rewritten to the memory (operation S1001). The processing corresponds to functions of the heap up processing unit 403 in FIG. 4.

The processing illustrated in FIG. 10 other than S1001 is substantially the same as that of FIG. 7.

Figure 11A:
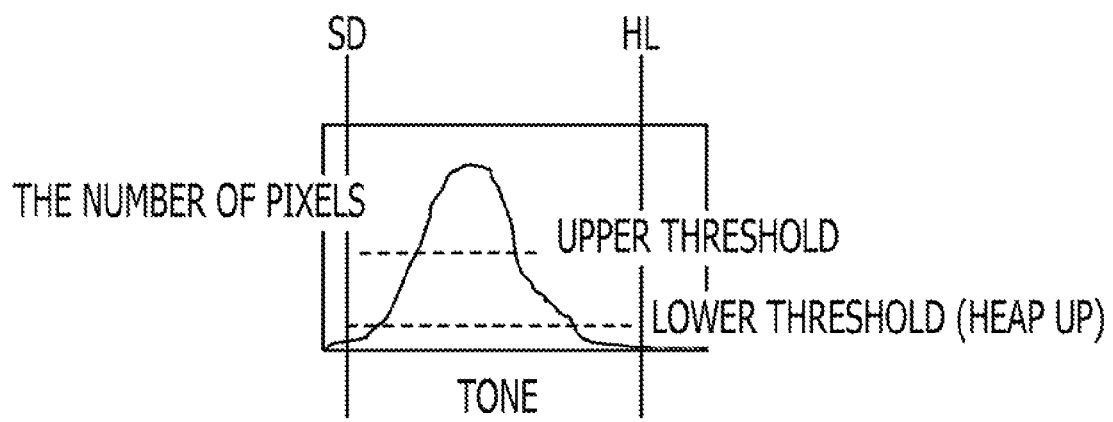
FIGS. 11A and 11B illustrate a fourth embodiment.
Figure 11B:
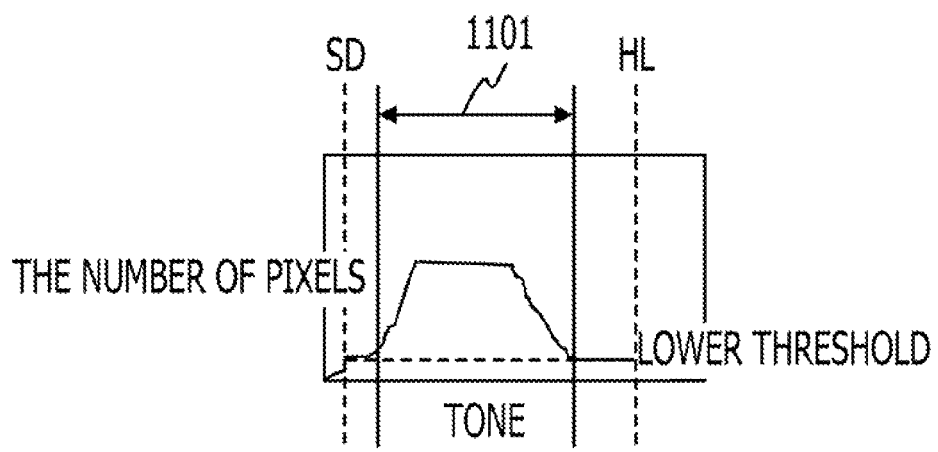

An image display device according to a fourth embodiment will be described. FIGS. 11A and 11B illustrate the fourth embodiment.

As illustrated in FIG. 11A, in the histogram data before correction, a configuration in that when a value of the number of pixels for a tone is greater than or equal to an upper threshold, the value of the number of pixels is clipped to the upper threshold is substantially the same as the configuration of the first embodiment. Moreover, as illustrated in FIG. 11A, a configuration that heaps up a value of the number of pixels for a tone that is present between SD and HL in the histogram data before correction and that the value of the number of pixels is less than the lower threshold to the lower threshold is substantially the same as the configuration of the second embodiment.

Differences between the configuration of the fourth embodiment and the configurations of the second and the third embodiments are as follows. In other words, in FIG. 11B, the total number of clipped pixels is within a range of tones from SD+1 to HL−1, and is substantially uniformly allocated to a tone range 1101 that is a range other than to which the heap up processing is applied. The processing is executed by the allocation processing unit 404 of FIG. 4.

Accordingly, applying further correction may be avoided for tones to which the heap up processing is applied.

FIG. 12 is a flow chart illustrating a control operation performed by the image display device according to the fourth embodiment. The flow chart indicates as in the second and the fifth embodiments, for example, an operation that an image processor in the image processing device executes a control program stored in a program memory in the image processing device. Alternatively, the flow chart indicates an operation executed by hardware dedicated to image processing.

A configuration of data used by the control operation illustrated in the flow chart of FIG. 12 is based on the configuration of data in FIG. 6 that is related to the second embodiment and FIG. 9 that is related to the third embodiment.

In the flow chart of FIG. 12, processing to which the same reference numeral as that used in the second embodiment in FIG. 7 and the third embodiment in FIG. 10 is applied is used for substantially the same as the processing in FIG. 7 and FIG. 10, and therefore will not be described.

According to the fourth embodiment, processing as described below is executed for the processing of operation 1201 corresponding to the functions of the allocation processing unit 404 in FIG. 4.

In other words, a total sum of the number of pixels clipped for respective tones is allocated to respective tones that are present between a first luminance value SD and a second luminance value HL and that a value of the number of pixels is greater than the lower threshold for heap up that is determined at operation S1001. For example, sequence data values Hin [SD+1] to Hin [HL−1] on a memory corresponding to respective tones that are present between the first luminance value SD and the second luminance value HL in the histogram data before correction are read from the memory. Sequence data of a tone with a value of the number of pixels greater than the register value of the lower threshold is selected from the sequence data values. The register value of the total number of clipped pixels is added to the above described selected sequence data values respectively. The respective addition results are calculated as sequence data value Hout [i] corresponding to respective tones of the above-described selected sequence data in the corrected histogram data 408 and are written to the memory.

Moreover, among the sequence data values Hin [SD+1] to Hin [HL−1], for sequence data of each tone that the value of the number of pixels less than or equal to the register value of the lower threshold, the sequence data is output as a sequence data value of the corrected histogram 408 as it is.

A correspondence relationship between each of the values of the number of pixels for tones from 0 to SD and from HL to a substantially maximum tone value in the histogram data before correction 407 and each of the values of the number of pixels for corresponding tones in the corrected histogram data is substantially the same as the correspondence relationship according to the second embodiment.

The processing of operation S1201 corresponds to functions of the allocation processing unit of FIG. 4.

The processing illustrated in FIG. 12, with the exception of operation S1201, is substantially the same as the processing illustrated in FIG. 7 and FIG. 10.

A fifth embodiment of an image display device will be described.

Figure 13A:
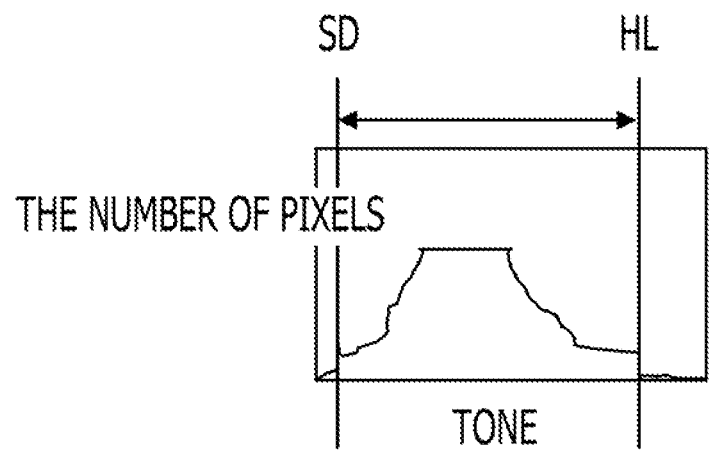
FIGS. 13A and 13B illustrate a fifth embodiment.
Figure 13B:
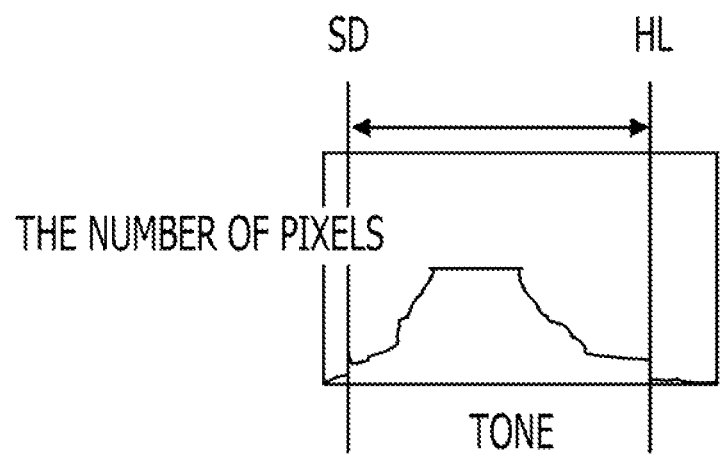

FIGS. 13A and 13B illustrate a fifth embodiment.

According to the fifth embodiment, for example, as in the second embodiment, a state of the corrected histogram data as illustrated in FIG. 13A that is corrected by clip processing and allocation processing is determined, for example, as in the second embodiment. When a total number of pixels of the corrected histogram data 408 exceeds a total number of pixels of the histogram data before correction 407, an adjustment described below is applied so that the total numbers of pixels of the corrected histogram data 408 matches with that of the histogram data before correction 407 within a certain error range.

In other words, as illustrated in FIG. 13A, an adjustment is performed to substantially uniformly reduce the values of the number of pixels for respective tones that are present between the first luminance value SD+1 and the second luminance value HL−1 in the corrected histogram data 408.

Alternatively, the embodiment may be configured so that an adjustment to reduce the number of pixels may be applied starting from a tone with a larger value of the number of pixels among values of the number of pixels for respective tones that are present from SD+1 and HL−1 in the corrected histogram data 408.

As a result, as illustrated in FIG. 13B, in the corrected histogram data 408 after readjustment, histogram data is obtained in which the number of pixels for each tone becomes smaller as compared with the histogram before adjustment illustrated in FIG. 13A.

The correction unit 405 in FIG. 4 uses a cumulative tone curve generated from readjusted corrected histogram data 408 as illustrated in FIG. 13B as a density conversion curve.

As a result, according to the fourth embodiment, an image balance of input image data and output image data 409 may be adjusted.

FIGS. 14A and 14B compare tones and contrasts before and after correcting an image to which the tone curve according to the above-described first to fifth embodiments is applied, and to which a tone curve of a related art is applied. FIG. 14A compares images under a condition in which no external light is irradiated. FIG. 14B compares images under a condition in which external light is irradiated. A result of the embodiment reveals that a contrast is enhanced for all tone ranges as compared with the image before correction when external light is irradiated. Meanwhile, the result of the related art reveals that the contrast may be more deteriorated than the contrast of the image before correction and contrast of some tones may increase significantly. Furthermore, when no external light is irradiated, a result of the embodiment reveals that a state of contrast before correcting an image is maintained, however, a result of the related art reveals that a contrast is substantially changed from the image before correction.

The above-described examples of results indicate that the embodiment enhances the contrast of the image before correction when external light is irradiated while maintaining a contrast of the image before correction when no external light is irradiated.

Figure 15A:
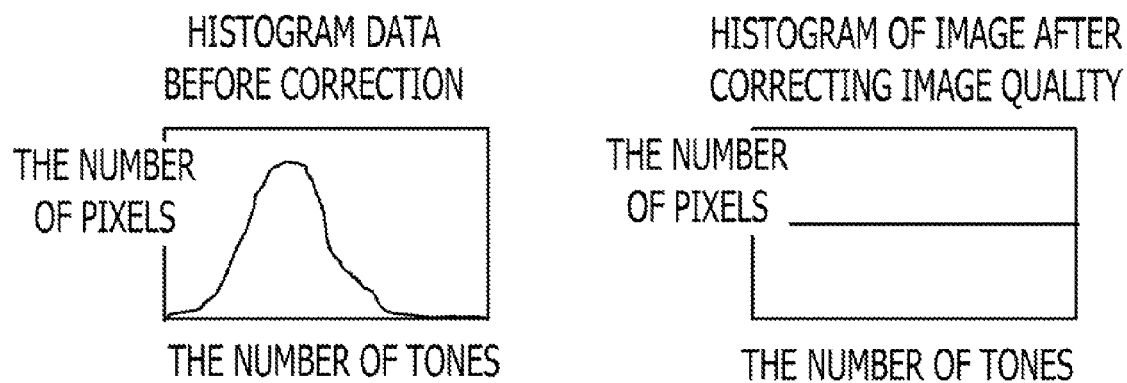
FIG. 15A compares histograms of each image before and after image processing by a related art (equalization)
Figure 15B:
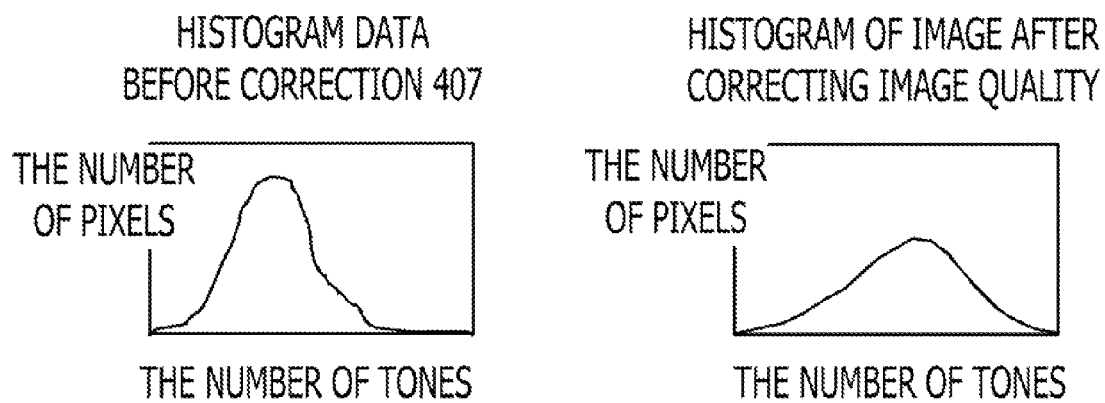
FIG. 15B compares histograms of each image before and after image processing according to an embodiment.

FIGS. 15A and 15B compare histograms of images before and after applying image processing according to the related art and the embodiment. According to the related art, as illustrated in FIG. 15A, a histogram of an output image data after correcting image quality is unnaturally flattened for the histogram data before correction. On the other hand, according to the embodiment, as illustrated in FIG. 15B, a histogram of an output image data 409 after correcting image quality indicates that a contrast is adjusted while maintaining characteristics of the original histogram for the histogram data before correction 407.

Figure 16:
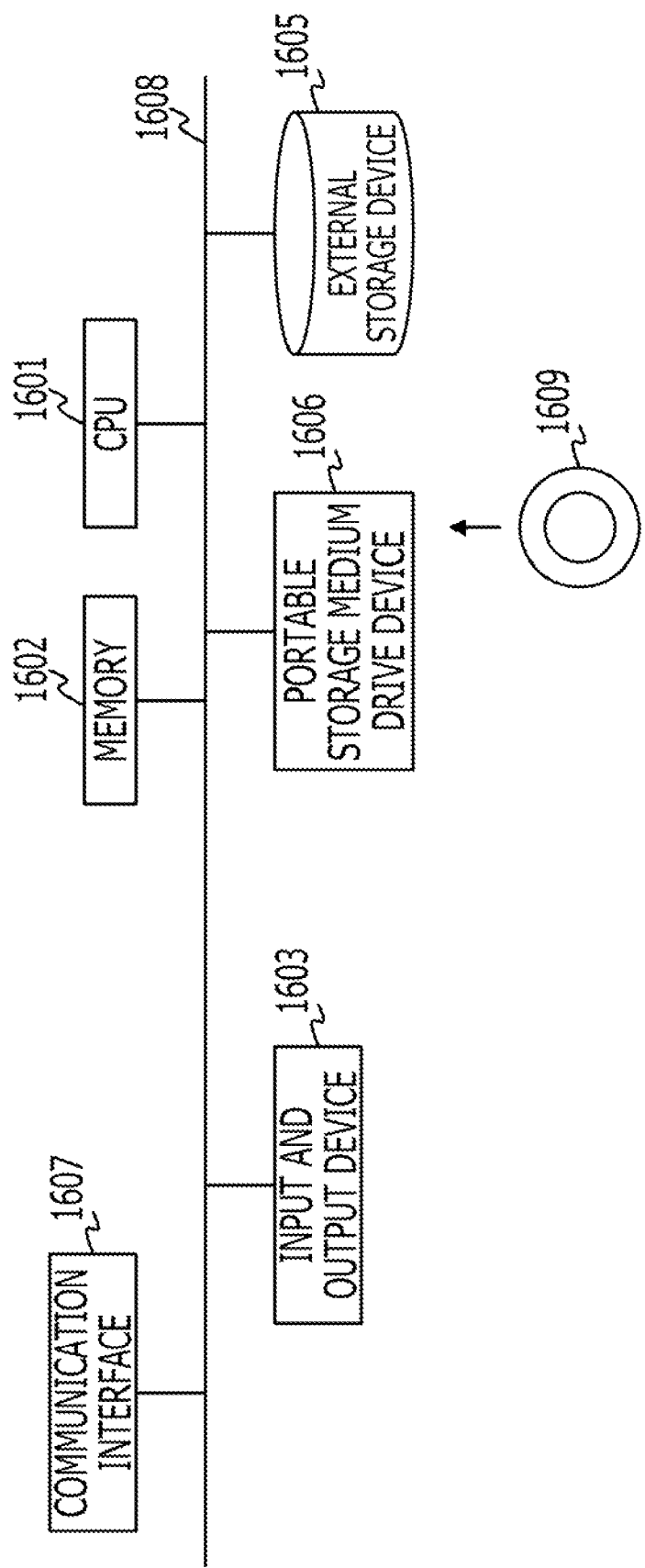
FIG. 16 illustrates an example of hardware configuration of a computer that may achieve a device according to an embodiment.

FIG. 16 illustrates an example of a hardware configuration of a computer according to the above-described embodiments.

A computer illustrated in FIG. 16 includes a CPU 1601, a memory 1602, an input and output device 1603, an external storage device 1605, a portable storage medium drive device 1606 to which a portable storage medium 1609 is inserted, and a communication interface 1607 and these components are interconnected through a bus 1608.

The CPU 1601 controls the entire computer. The memory 1602 may be, for example, a random access memory (RAM) that temporarily stores a program or data stored in the external storage device 1605 (or the portable storage medium 1609) when executing the program or updating the data. The CPU 1601 controls the entire operation by reading a program to the memory 1602 and executing the program.

The input and output device 1603 detects an input operation by a user, for example, through a keyboard or a mouse, notifies the CPU 1601 of the detection result, and outputs data transmitted by a control by the CPU 1601 to a display device or a printer. The input and output device 1603 includes input device and output device. A display unit is an example of output device.

The external storage device 1605 may be, for example, a hard disk storage device. The portable storage medium drive device 1606 accommodates the portable storage medium 1609. The communication interface 1607 connects a communication line of, for example, a local area network (LAN).

A device according to the embodiment is achieved by executing each control program corresponding to each flow chart that achieves functional blocks of FIG. 4 by the CPU 1601. The program is stored, for example, in the external storage device 1605 or the portable storage medium 1609.

Alternatively the program may be obtained through a network by the communication interface 1607.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image display device comprising:
   circuitry configured to
     calculate histogram data before correction that indicates a luminance distribution from an input image data;
     set a value of the number of pixels of a tone to an upper threshold when the tone among tones of luminance values in the histogram data before correction includes the value of the number of pixels greater than or equal to the upper threshold;
     correcting the histogram data by adding a value of the number of pixels based on a difference between the upper threshold and a value of the number of pixels for each tone that is set to the upper threshold in the histogram data before correction to a value of the number of pixels of at least a part of tones that are present between a first luminance value and a second luminance value and output the corrected histogram data;
     correct the input image data to output image data based on the corrected histogram data; and
     display the output image data.

2. The image display device according to claim 1, wherein the circuitry is configured to add a value of the number of pixels obtained by summing a difference between the upper threshold and a value of the number of pixels for each tone that is set to the upper threshold in the histogram data before correction to a value of the number of pixels of at least a part of tones that are present between the first luminance value and the second luminance value.

3. The image display device according to claim 1,
   wherein the first luminance value is a tone value which is close to 0; and
   wherein the second luminance value is a tone value which is close to a substantially maximum value.

4. The image display device according to claim 1, wherein the circuitry is configured to set a value of the number of pixels for a tone to a lower threshold when the value of the number of pixels for the tone is less than the lower threshold among tones of luminance values that are present between the first luminance value and the second luminance value in the histogram data before correction.

5. The image display device according to claim 4, wherein the circuitry is configured to add a value of the number of pixels based on the difference to a value of the number of pixels for each tone that a value of the number of pixels is greater than or equal to the lower threshold within a range of tones that are present between the first luminance value and the second luminance value.

6. The image display device according to claim 2, wherein the circuitry is configured to set a value of the number of pixels for a tone to a lower threshold when the value of the number of pixels for the tone is less than the lower threshold among tones of luminance values that are present between the first luminance value and the second luminance value in the histogram data before correction.

7. The image display device according to claim 6, wherein the circuitry is configured to allocate and add the summed values of number of pixels to a value of the number of pixels for each tone that is greater than or equal to the lower threshold within a range of tones that are present between the first luminance value and the second luminance value.

8. The image display device according to claim 1, wherein the circuitry is configured to subtract a value of the number of pixels for each tone that is present between the first luminance value and the second luminance value in the histogram data before correction when the total number of pixels of the corrected histogram data exceeds the number of pixels of the histogram data before correction.

9. The image display device according to claim 8, wherein the circuitry is configured to subtract a value of the number of pixels for each tone in the histogram data before correction in an order starting from a tone with the largest value of the number of pixels.

10. An image processing method executed by a computer comprising:
    calculating, by circuitry of the computer, histogram data before correction that indicates a luminance distribution from an input image data;
    setting, by the circuitry, a value of the number of pixels of a tone to an upper threshold when the tone among tones of luminance values in the histogram data before correction includes the value of the number of pixels greater than or equal to the upper threshold;
    correcting the histogram data by adding, by the circuitry, a value of the number of pixels based on a difference between the upper threshold and a value of the number of pixels for each tone that is set to the upper threshold in the histogram data before correction to a value of the number of pixels of at least a part of tones that are present between a first luminance value and a second luminance value;
    outputting, by the circuitry, the corrected histogram data that includes added values of the number of pixels; and
    correcting, by the circuitry, the input image data to the output image data based on the corrected histogram data.

11. The image processing method according to claim 10, wherein the adding sums a difference between the upper threshold and a value of the number of pixels for each tone that is set to the upper threshold in the histogram data before correction and adds the summed values of the number of pixels to a value of the number of pixels of at least a part of tones that are present between the first luminance value and the second luminance value.

12. The image processing method according to claim 10, wherein the first luminance value is a tone value which is close to 0; and wherein the second luminance value is a tone value which is close to a substantially maximum value.

13. The image processing method according to claim 10, further comprising:
    setting a value of the number of pixels for a tone to a lower threshold when the value of the number of pixels for the tone is less than the lower threshold among tones of luminance values that are present between the first luminance value and the second luminance value in the histogram data before correction.

14. The image processing method according to claim 13, further comprising:
    adding a value of the number of pixels based on the difference to a value of the number of pixels for each tone of which a value of the number of pixels is greater than the lower threshold within a range of tones that are present between the first luminance value and the second luminance value.

15. The image processing method according to claim 11, further comprising:
setting a value of the number of pixels for a tone to a lower threshold when the value of the number of pixels for the tone is less than the lower threshold among tones of luminance values that are present between the first luminance value and the second luminance value in the histogram data before correction.

16. The image processing method according to claim 15, further comprising:
allocating and adding the summed values of number of pixels to a value of the number of pixels for each tone that is greater than or equal to the lower threshold within a range of tones that are present between the first luminance value and the second luminance value.

17. The image processing method according to claim 10, further comprising:
subtracting a value of the number of pixels for each tone that is present between the first luminance value and the second luminance value in the histogram data before correction when the total number of pixels of the corrected histogram data exceeds the number of pixels of the histogram data before correction.

18. The image processing method according to claim 17, wherein the subtracting subtracts a value of the number of pixels for each tone in the histogram data before correction in an order starting from a tone with the largest value of the number of pixels.

19. An image processing device comprising:
circuitry configured to
calculate histogram data before correction that indicates a luminance distribution from an input image data;
set a value of the number of pixels of a tone to an upper threshold when the tone among tones of luminance values in the histogram data before correction includes the value of the number of pixels greater than or equal to the upper threshold;
correct the histogram data by adding a value of the number of pixels based on a difference between the upper threshold and a value of the number of pixels for each tone that is set to the upper threshold in the histogram data before correction to a value of the number of pixels of at least a part of tones that are present between a first luminance value and a second luminance value and output the corrected histogram data; and
correct the input image data to output image data based on the corrected histogram data.

20. An image display device comprising:
means for calculating histogram data before correction that indicates a luminance distribution from an input image data;
means for setting a value of the number of pixels of a tone to an upper threshold when the tone among tones of luminance values in the histogram data before correction has the value of the number of pixels greater than or equal to the upper threshold;
means for correcting the histogram data by adding a value of the number of pixels based on a difference between the upper threshold and a value of the number of pixels for each tone that is set to the upper threshold in the histogram data before correction to a value of the number of pixels of at least a part of tones that are present between a first luminance value and a second luminance value;
means for outputting the corrected histogram data that includes added values of the number of pixels; and
means for correcting the input image data to the output image data based on the corrected histogram data.

* * * * *